United States Patent [19]

Enderle

[11] Patent Number: 5,058,378
[45] Date of Patent: Oct. 22, 1991

[54] INTEGRATED TURBORAMJET ENGINE

[75] Inventor: Heinrich Enderle, Gröbenzell, Fed. Rep. of Germany

[73] Assignee: MTU Motoren- und Turbinen-Union Munich GmbH, Fed. Rep. of Germany

[21] Appl. No.: 505,043

[22] Filed: Apr. 5, 1990

[30] Foreign Application Priority Data

Apr. 14, 1989 [DE] Fed. Rep. of Germany ....... 3912330

[51] Int. Cl.⁵ .......................... F02C 7/042; F02K 7/16
[52] U.S. Cl. ......................................... 60/224; 60/225; 60/270.1
[58] Field of Search ...................... 60/224, 225, 270.1, 60/244, 245; 137/15.1, 15.2

[56] References Cited

U.S. PATENT DOCUMENTS 2,955,414 10/1960 Hausmann .............................. 60/261
3,161,018 12/1964 Sandre .................................. 60/244

Primary Examiner—Richard A. Bertsch
Assistant Examiner—Laleh Jalali
Attorney, Agent, or Firm—Evenson, Wands, Edwards, Lenahan & McKeown

[57] ABSTRACT

A change-over arrangement for an integrated turboramjet engine has a guide ring which can be displaced in the axial direction and an annular cone which can be displaced against the guide ring. In the turbo-operation, the annular cone is in its front position and the guide ring is in its rear position closing off a ram air inlet duct, and in the ramjet operation, the annular cone, in its rear position, closes off the turbo-inlet duct, and the guide ring opens up the ram air inlet duct. As a result, a low-loss introduction of the air current can take place into the turbo-inlet duct or into the ram air inlet duct, without, at the same time, requiring disadvantageous enlargements of the diameter of the outer casing of the engine.

14 Claims, 2 Drawing Sheets

INTEGRATED TURBORAMJET ENGINE

BACKGROUND AND SUMMARY OF THE INVENTION

The invention relates to an integrated turboramjet engine for a hypersonic airplane having a common air inlet for the turbo-circuit and the ramjet circuit. An annular turbo-inlet duct and a ram air inlet duct which concentrically surrounds this turbo-inlet duct are provided. On the exterior side the ram air inlet is delimited by an engine casing. An inlet cone and movable devices for the deflecting of the air current from the common air inlet into one of the two inlet ducts is provided.

Endeavors are taking place to develop hypersonic airplanes which can take off and land on normal airports and develop cruising speeds of several Mach. Hypersonic airplanes of this type may be used either as fast long-distance transport planes or as normally starting space tugs. The achievable Mach numbers range between Mach 4 and 8 at flying altitudes of approximately 30 km.

Engines for propelling such airplanes must meet a number of requirements which cannot be reached by means of conventional engine concepts. Thus, a sufficient power output must take place at low flying speeds below Mach 1 up to the peak speeds. For this purpose, it was suggested to provide combined turboramjet engines which at low flying speeds operate as a gas turbo-engine with or without an afterburner and, above a certain flying speed, operate as ramjet engines (RAM-operation).

A construction of such engines provides that a gas turbo-engine is equipped on both sides with flaps, and an afterburner downstream of the gas turbine is simultaneously used as a ramjet burner chamber. For this purpose, an annular ram air duct is provided concentrically outside the gas turbine through which, during ramjet operation, the inflowing air is guided directly into the combustion chamber while bypassing the gas turbine. For this purpose, movable guide plates are provided in the area of the inlet duct and behind the turbine, these guide plates selectively guiding the air current either into the concentrically interior turbo-inlet duct and thus through the gas turbine core engine, or into the concentrically exterior ram air inlet duct.

It is a considerable problem in the case of such change-over engines that the outside diameter of the engine must be kept as small as possible. Its minimum measurement is determined by the cross-sections of the two inlet ducts as well as the inside diameter required in the hub area for the core engine.

A conceivable, constructively very simple possibility for the alternative acting upon the inlet ducts consists of providing an axially slidable guide plate ring which, in a first position, closes off the ram air inlet duct and in a second position closes off the turbo-inlet duct. However, this type of a solution has the disadvantage that the inlet duct carry out up complex courses and an outside diameter of the engine is required which exceeds the minimum diameter. Such enlargements of the diameter which are in the range of several decimeters, at high speeds, because of the enlarged cross-sectional surface, result in an increased flow resistance.

It is therefore an object of the present invention to develop a turboramjet engine of the above-mentioned type such that a deflection of the air current into the two inlet ducts is possible without the requirement of an enlargement of the outside diameter of the engine.

According to the invention, this object is achieved by means of an arrangement, wherein the devices for the deflecting of the air current comprise a guide ring which can be displaced in the axial direction along the engine casing for the closing-off of the ram air duct as well as an annular cone which is disposed radially inside with respect to the guide ring and can be displaced in the opposite direction for the closing-off of the turbo-inlet duct, the contour of the guide ring forming the duct wall and the annular cone having a construction which is advantageous with respect to the flow.

The principal advantage of the invention is that despite the fact that the minimum diameter defined by the inlet ducts is maintained, a deflection of the air current into the two inlet ducts is possible, in which case, at the same time, a low-loss housing contour of the flow ducts can be achieved. In addition, by means of this arrangement, a maintaining of the engine output is also achieved in the critical moment of the change-over from the turbo-operation to the ramjet operation in that the approaching air, in a targeted and continuous manner, can be deflected from one inlet duct in connection with the closing device behind the turbine into the other inlet duct. Additional advantages of the invention are the short installation length of the closing device and the short strokes of the adjusting arrangements. Also, during the ramjet operation, good cooling possibilities exist for the thermally stressed inlet cone and the annular cone by means o film cooling as a result of the blowing-in of cold air.

In an advantageous further development of the invention, the guide ring has an approximately conically tapering front side and a connecting approximately conically tapering rear side. The guide ring is therefore constructed to be approximately wedge-shaped, in which case the front side is shaped out for forming an aerodynamically advantageous flow contour of the turbo-inlet duct during the turbo-operation In this operating condition, the guide ring is in its axial rear position, and its front side is advantageously shaped such that the wall contour from the outside casing to the intermediate casing, which at the same time also represents the outer boundary of the turbo-inlet duct, causes the lowest possible flow losses. The rear side of the guide ring is developed such that, while interacting with the annular cone, during the ramjet operation, it defines an annular duct connected with a ram air inlet duct. For this purpose, the rear side is preferably constructed to be conical.

During the ramjet operation, the guide ring is in its axially frontal position, in which case, at the same time, the annular cone is arranged slightly behind and radially inside the guide ring. In this case, the rear side of the guide ring defines the frontal section of the exterior wall of the ram air inlet duct. At the same time, the annular cone is shaped such that a continuous flow course is possible from the inlet cone to the intermediate casing.

The ring edge between the front side and the rear side of the guide ring is also shaped such that during the ramjet operation a flow loss occurs in this area that is as low as possible.

Another advantageous development of the invention consists of the fact that the frontal axial position of the annular cone is fixed in such a manner that the annual duct formed between the annular cone and the inlet cone has at least the cross-section of the ram air inlet duct. This arrangement has the advantage that during the changing-over from the turbo-operation to the ramjet operation, after the opening of the ram air inlet duct, sufficient air can be admitted to the ram air inlet duct by the advancing of the guide ring.

A further development according to the invention provides that, for the changing-over from the turbo-operation to the ramjet operation, the guide ring can first be slid from an axially rear position toward the front, and subsequently, the annular cone is displaced from an axially frontal position toward the rear. Approximately at the same time with the advancing of the guide ring, a closing flap will close arranged downstream of the core engine so that no more air is taken into the turbo-inlet duct; i.e with the advancing of the guide ring, the ram air inlet duct is opened up and the approaching air is guided into it. Then the annular cone is moved from a frontal position toward the rear and, in its end position, closes off the turbo-inlet duct completely.

As an alternative, it is also possible to carry out the two movements of the guide ring and the annular cone in opposing directions not successively but partly or completely simultaneously. As a result, the change-over time from the turbo-operation to the ramjet operation and vice versa can be advantageously shortened.

The annular cone preferably has the continuation of the contour of the inlet cone and, if required, may have a bend, preferably a convex bend viewed from the inflow direction, if the inlet cone has a bend of this shape.

The annular cone can be moved axially by means of adjusting devices, in which case, at the same time, the axial guiding and locking in certain positions will take place.

Other objects, advantages and novel features of the present invention will become apparent from the following detailed description of the invention when considered in conjunction with the accompanying drawings.

DETAILED DESCRIPTION OF THE DRAWINGS

Figure 1:
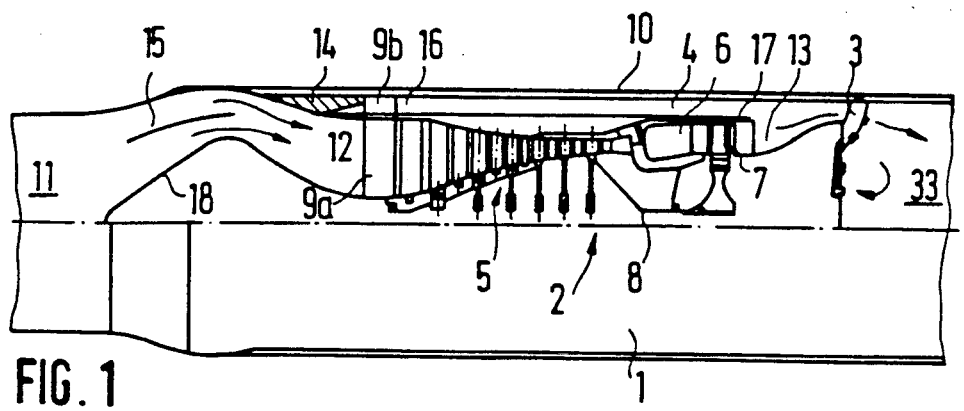
FIG. 1 is an axial sectional schematic view of an integrated turboramjet engine, constructed according to a preferred embodiment of the invention.

FIG. 1 is an axial view of an integrated turboramjet engine 1 which can be changed over from the turbo-operation to the ramjet operation. It comprises essentially a gas turbine 2 with injection arrangements 3 which operate as an afterburner injection arrangement in the turbo-operation and as ramjet injection arrangements in the ramjet operation, in which case the ram air, by way of the annular duct 4, while bypassing the gas turbine 2, is supplied directly to an afterburner pipe arranged behind the injection arrangements 3.

The gas turbine 2 comprises a 6-stage compressor 5 behind which a combustion chamber 6 and a single-stage turbine 7 is connected. The compressor 5 and the turbine 7 are connected with one another by means of a common shaft 8. It is also possible to construct the engine as two- or three-shaft engine according to the requirements, without leaving the scope of the invention. The weight forces and the gas forces generated in the gas turbine 2, by way of several supporting ribs 9a, 9b distributed over the circumference are guided to the engine casing 10 which, in turn, is fastened to the airplane.

In the position shown in FIG. 1, the turboramjet engine 1 is in the turbo-operation; i.e., the air approaching in the common air inlet 11 is guided into the turbo-air inlet duct 12 and leaves the gas turbine 2 at the gas turbine outlet 13 while flowing around the injection arrangement 3 and flowing into the afterburner pipe 33.

For the changing-over from the shown turbo-operation to the ramjet operation, a guide ring 14 and an annular cone 15, in the area of the air inlet 11, are displaced axially against one another in such a manner that the turbo-air inlet duct 12 is closed and a ram air inlet duct 16 is opened up which is arranged concentrically outside this turbo-air inlet duct 12. As a result, the air current arriving in the air inlet 11, while bypassing the gas turbine 2, by way of the ram air inlet duct 16 and duct 4, is supplied directly to the afterburner pipe 3. At the same time, during the ramjet operation, a closing ring 17 is slid axially toward the rear against the position shown in FIG. 1, and as a result, closes off the gas turbine outlet 13.

Figure 2:
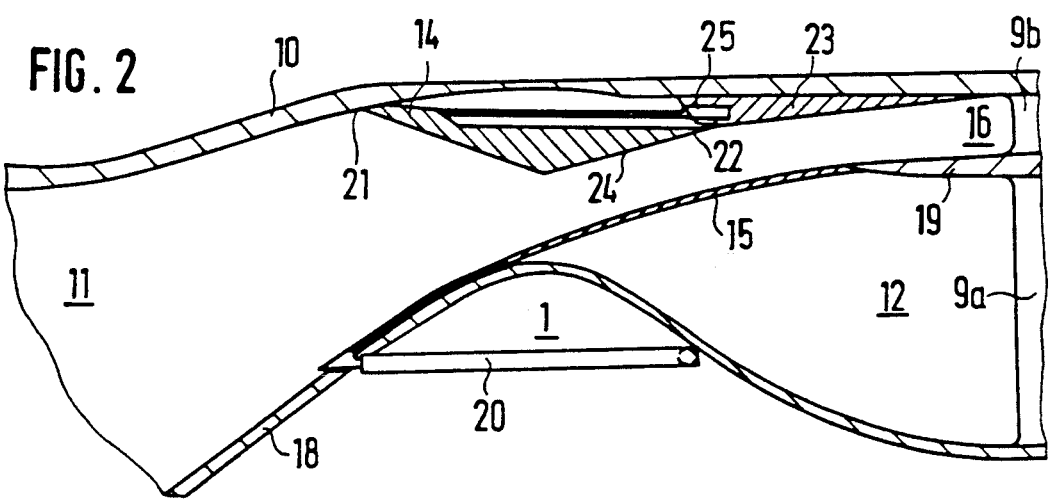
FIG. 2 is an enlarged cutout sectional schematic view of a portion of this engine in the ramjet operation.
Figure 3:
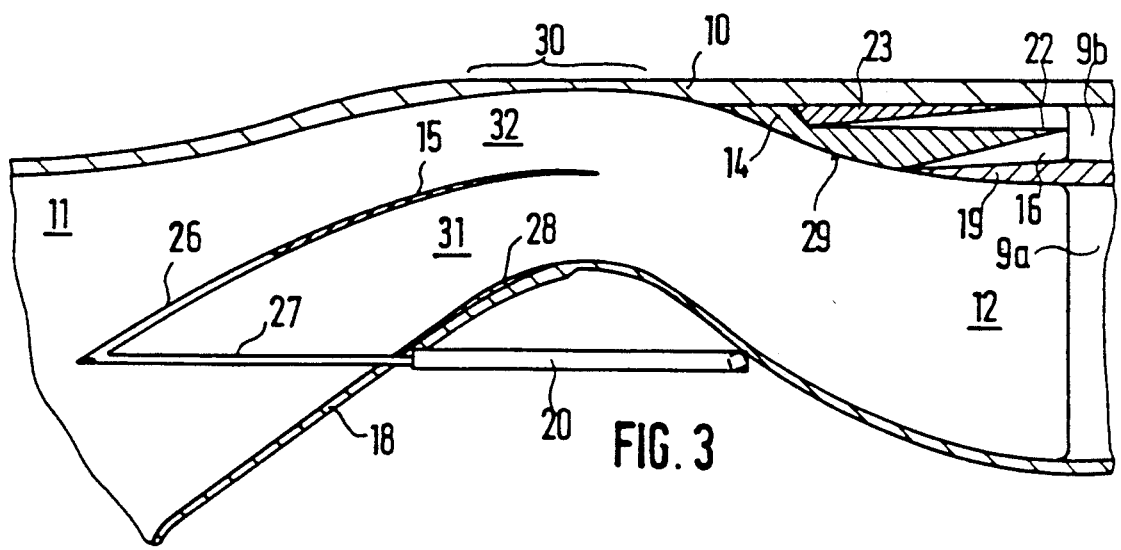
FIG. 3 is a similar cutout of the engine in the turbo-operation.

The interaction of the guide ring 14 and the annular cone 15 according to the invention is shown in FIGS. 2 and 3 in an enlarged representation for the ramjet operation and for the turbo-operation.

Figure 4:
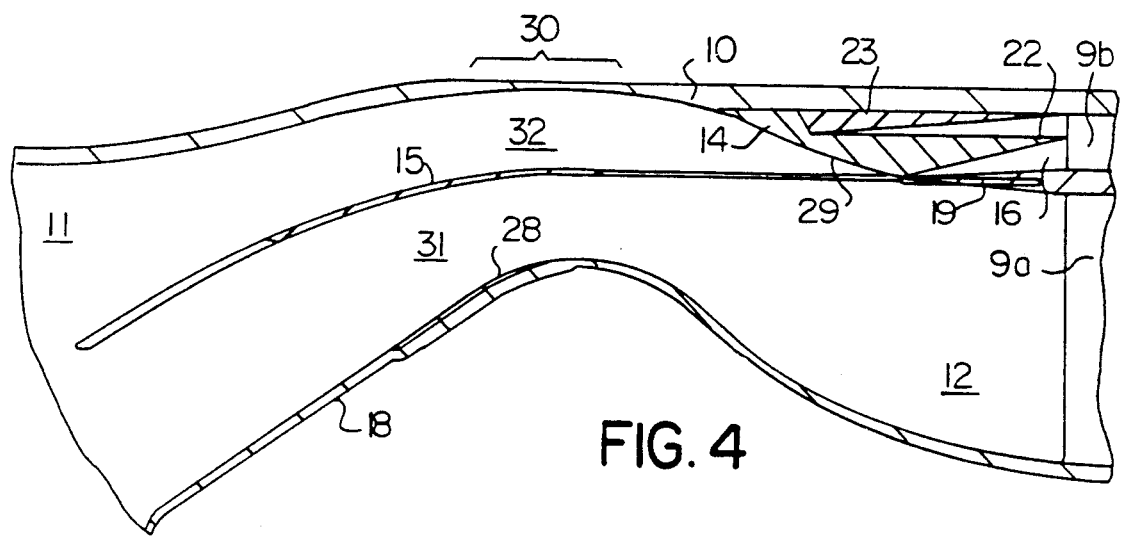
FIG. 4 is a cut-out sectional view of another embodiment of the invention.

In the position shown in FIG. 2, the turboramjet engine 1 is in the ramjet operation s that the turbo-air inlet duct 12 is closed off by means of the annular cone 15. At the same time, the ram air inlet duct 16 is connected with the common air inlet 11. For this purpose, the guide ring 14 is moved into its axial frontal end position. The annular cone 15 has a shape which aerodynamically represents a continuation of an inlet cone 18 which guides the air jet in the area of the air inlet 11. In this case, the annular cone, on the interior side, rests sealingly against the inlet cone 18 and, on the exterior side, against the intermediate casing 19 which separates the turbo-air inlet duct 12 from the ram air inlet duct 16 which surrounds it radially. By means of an adjusting arrangement 20, the annular cone 15, if required, can be displaced from an axial rear end position toward the front and is also held and guided by this adjusting arrangement 20. These adjusting arrangements 20 are supported in the inlet cone 18. As an alternative, it is also possible to house these adjusting arrangements in the intermediate housing 19 and to connect them with the rear edge of the annular cone 15 by means of rods as shown in FIG. 4. The latter arrangement will be particularly advantageous if the intermediate casing 19 has a sufficient thickness.

In the shown position, the front edge 21 sealingly ends at the engine casing 10. The rear edge 22 sealingly rests against an annular molded body 23. The rear side of the guide ring 14 has such a shape that, together with the molded body 23, it permits a low-loss introduction of the air current located at the air inlet 11 into the ram air inlet duct 16. The guide ring 14 can be moved axially in the opposite direction to the annular cone 15 by means of the guide ring adjusting arrangement 25, while being guided along the molded body 23. In this case, the two adjusting arrangements 20 and 25 can be operated independently of one another.

As an alternative, it is also possible to leave the molded body 23 out completely and to construct the guide ring 14 correspondingly longer. This arrangement has the disadvantage, however, that the radially exterior row 9b of supporting ribs must be displaced axially to the rear, and thus a less advantageous guiding of the gas forces and of the weight forces takes place from the gas turbine 2 into the engine casing 10. In the ramjet operation, all movable parts, thus particularly the guide ring 14 and the annular cone 15, are firmly braced and have a sealing effect, and all propulsion and guiding elements, particularly the adjusting arrangements 20, 25 and the push rods 27 and holding struts 26 are housed in a sealed and thermally protected manner in order to prevent that they are acted upon by the hot approaching air of approximately 2,200 K.

The guide ring adjusting arrangement which, at the same time, serves the axial guiding and fixing is housed in the molded body 23 and is sealed off against hot air.

FIG. 3 shows the arrangement according to the invention in the turbo-operation; i.e., that the turbo-air inlet duct 12 is connected with the common air inlet 11, while the ram air inlet duct 16 is closed. For this purpose, the annular cone 15 is in a position which is moved axially toward the front in comparison to FIG. 2, which is carried out by means of the adjusting arrangement 20. The annular cone 15 is connected with the adjusting arrangement 20 by means of a row of radially aligned holding struts 26 which, in turn, are connected with axially movable push and guide rods 27. The push and guide rods 27 and the holding struts 26, in their cross-section, are constructed to be advantageous with respect to the flow, in which case, an increased bending strength can be achieved preferably by means of a drop-shaped cross-sectional profile in addition to a favorable flow contour. The inlet cone 18 has a number of axial grooves 28 into which the holding struts 26 can be moved in the ramjet operation in order to interfere as little as possible with the flow contour of the inlet cone 18. In the turbo-operation, the guide ring 14 is in its axial rear end position while at the same time the molded body 23 is completely covered with respect to the air flow. In this case, the front side 29 of the guide ring 14 is shaped out such that a flow contour can be achieved from the interior side of the engine casing 10 to the intermediate casing 19 which is as favorable as possible.

For this purpose, its upstream front section is shaped to be concave and its rear section is shaped to be convex. The contour is constructed to be such that the front side 29, together with the rear side of the inlet cone 18, has a cross-section which narrows down from the air inlet 11 to the turbo-air inlet duct 12 in order to accelerate the flow and prevent flow separations.

At the same time, the guide ring 14, on the interior side, has a sealing effect with respect to the intermediate casing 19, and, on the exterior side, has a sealing effect with respect to the turbine casing 10 in order to prevent that heating gases from the gas turbine outlet 13 flow back backwards by way of the duct 4 into the turbo-air inlet duct 12. The sealing of the guide ring 14 on the exterior side may also take place with respect to the molded body 23 in order to reduce the sealing forces.

With respect to their length, the guide ring 14 and the molded body 23 are coordinated with one another in such a manner that the rear edge 22 of the guide ring 14 ends shortly in front of the supporting ribs 9b. These supporting ribs 9b, in turn, should be radially aligned with the supporting ribs 9a in order to ensure a load transmission that is as favorable as possible. Because of the high temperatures occurring in the ramjet operation, the engine casing 10 is constructed as an insulating casing which explains its large thickness. However, in the turbo-operation, such a thickness is not required so that the engine casing 10, without increasing the outside diameter, viewed from the interior may be concavely curved in area 30 in order to achieve an improved transition to the front side 29 of the guide ring 14 and permit an increased diameter of the inlet cone 18 while the flow cross-section is maintained at the same time.

The axial front position of the annular cone 15 is advantageously selected such that the annular duct 31 defined between the annular cone 15 and the inlet cone 18 has a cross-section which corresponds at least to the cross-section of the ram air duct 16. In this case, the engine casing, the annular cone and the inlet cone are coordinated such that the conditions of the flow cross-sections from the annular duct between the engine casing and the annular cone to the annular duct are the same at the inlet and the outlet. This takes place in order to deflect the air current located in the annular duct 16 into the ram air inlet duct 16 during the change-over from the turbo-operation to the ramjet operation. The reason is that, for the change-over, the guide ring 14 is first pushed toward the front whereby the exterior ring duct 32 defined between the annular cone 15 and the engine casing 10 is increasingly closed. As a result, the ram air inlet duct 16 is opened at the same time so that the air current located in the interior annular duct 31 is deflected more and more from the turbo-air inlet duct 12 to the ram air inlet duct 16. After, simultaneously with the advancing of the guide ring 14, the closing ring 17 (FIG. 1) of the ga turbine outlet 13 was pushed toward the rear and therefore the throughput through the gas turbine 2 was stopped, the air current is necessarily also deflected into the ram air inlet duct 16. By means of the subsequent moving-back of the annular cone 15, a contour from the inlet cone 18 to the exterior wall of the intermediate casing 19 is produced which is advantageous with respect to the flow.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An integrated turboramjet engine for a hypersonic airplane having a common air inlet with a total flow through a total common inlet cross-section for the turbo-circuit and the ramjet circuit comprising:
   an annular turbo-inlet duct;
   a ram air inlet duct which concentrically surrounds this turbo-inlet duct and which, on its exterior side, is delimited by an engine casing;
   an inlet cone; and
   movable devices for the deflecting of the air current from the common air inlet into one of the two inlet ducts, said turbo-inlet duct and said ram air inlet duct receiving the total flow through the total common inlet cross-section;
   wherein the devices for the deflecting of the air current comprise a guide ring which can be displaced in the axial direction between an upstream and downstream position along the engine casing for the closing-off of the ram air duct as well as an annular cone having upstream and downstream ends, which is disposed radially inward with respect to the guide ring and can be displaced in the axial direction between an upstream and downstream position for the closing-off of the turbo-inlet duct, the contour of the guide ring forming the duct wall;

wherein the engine casing, the annular cone and the inlet cone are coordinated with one another along their axial length such that the air-flow in the cross-sections from the engine casing to the annular cone and from the annular cone to the inlet cone are the same at both ends of the annular cone when the annular cone is in the upstream position.

2. A turboramjet engine according to claim 1, wherein the guide ring has an inner contour facing radially inward which extends radially inward on the approach flow side and radially outward on the exit flow side.

3. A turboramjet engine according to claim 2, wherein the inner contour of the guide ring is constructed to form an aerodynamically smooth flow transition from the engine casing to an intermediate casing when in the downstream position.

4. A turboramjet engine according to claim 2, wherein the exit flow side of the guide ring interacting with the annular cone defines the inlet of the ram air inlet duct in the ramjet operation.

5. A turboramjet engine according to claim 2, wherein the inner contour on the approach flow side of the guide ring has a concave bend in its radially outward portion and has a convex bend in its radially inward portion.

6. A turboramjet engine according to claim 2, wherein the guide ring can be slid over an annular body mounted at the engine casing, the annular body continues the contour of the exit flow side of the guide ring in the direction of the engine casing during the ramjet operation.

7. A turboramjet engine according to claim 2, wherein the guide ring has a sealing effect on its radially exterior side along a body mounted on the engine casing and on its radially interior side along an intermediate casing when in the downstream position.

8. A turboramjet engine according to claim 1, wherein the annular cone at its downstream end seals to a front edge of an intermediate housing and at its upstream end rests sealingly against the inlet cone when in a downstream position and, wherein the front axial position of the annular cone is fixed such that the cross-section formed between the annular cone and the inlet cone has at least the cross-section of the ram air inlet duct.

9. A turboramjet engine according to claim 8, wherein the front axial position of the annular cone is fixed such that the annular duct formed between the annular cone and the inlet cone has at least the cross-section of the ram air inlet duct.

10. A turboramjet engine according to claim 1, wherein several holding struts aligned radially toward the interior of the engine are mounted to the annular cone along the radially interior circumference, of the annular one, these holding struts, by way of axially aligned push and guide rods, being connected with adjusting means mounted at the inlet cone.

11. A turboramjet engine according to claim 1, wherein, for the change-over from the turbo-operation to the ramjet operation, the guide ring can first be displaced toward the front from its axial rear position, and subsequently, the annular cone can be displaced toward the rear from its axial front position.

12. A turboramjet engine according to claim 10, wherein grooves for receiving the holding struts are provided in the inlet cone.

13. A turboramjet engine according to claim 1, wherein several axially aligned push and guide rods are mounted along the outer circumference of the annular cone and are coupled with adjusting arrangements mounted in the intermediate casing.

14. An integrated turboramjet engine for a hypersonic airplane having a common air inlet with a total flow through a total common inlet cross-section for the turbo-circuit and the ramjet circuit comprising:

an annular turbo-inlet duct;

a ram air inlet duct which concentrically surrounds this turbo-inlet duct and which, on its exterior side, is delimited by an engine casing;

an inlet cone; and movable devices for the deflecting of the air current from the common air inlet into one of the two inlet ducts, said turbo-inlet duct and said ram air inlet duct receiving the total flow through the total common inlet cross-section;

wherein the devices for the deflecting of the air current comprise a guide ring which can be displaced the axial direction along the engine casing for the closing-off of the ram air duct as well as an annular cone which is disposed radially inward with respect to the guide ring and can be displaced in the axial direction for the closing-off of the turbo-inlet duct, the contour of the guide ring forming the duct wall;

wherein the engine casing, the annular cone and the inlet cone in the area of their axial length corresponding to that of the annular cone are coordinated such that the air-flow conditions of the cross-sections from the engine casing to the annular cone and from the annular cone to the inlet cone are the same at both ends of the annular cone; and wherein a front axial position of the annular cone against the air current is fixed such that the annular cone cannot close-off the ram air inlet duct.

* * * * *